United States Patent [19]

Venetucci et al.

[11] 4,259,360
[45] Mar. 31, 1981

[54] DEOXYGENATION OF LIQUIDS

[75] Inventors: Jim M. Venetucci, Forest Park; John C. Orfe, Lynwood, both of Ill.

[73] Assignee: Liquid Carbonic Corporation, Chicago, Ill.

[21] Appl. No.: 30,656

[22] Filed: Apr. 16, 1979

[51] Int. Cl.³ .............................................. G01N 33/14
[52] U.S. Cl. ..................................... 426/231; 55/53; 55/55; 99/323.2; 426/475; 426/477; 426/487
[58] Field of Search ............... 426/475, 231, 487, 477, 426/490, 590, 330.3, 66, 67; 99/323.1, 323.2; 261/DIG. 7; 55/47, 53, 55, 160, 189

[56] References Cited

U.S. PATENT DOCUMENTS

| | | | |
|---|---|---|---|
| 3,113,871 | 12/1963 | Webster | 426/47 S |
| 3,165,562 | 1/1965 | Young et al. | 261/122 |
| 3,365,307 | 1/1968 | Dixon | 426/231 |
| 3,877,358 | 4/1975 | Karr | 261/DIG. 7 |
| 4,068,010 | 1/1978 | Karr | 261/DIG. 7 |
| 4,112,828 | 9/1978 | Mojonnier et al. | 426/47 S |

*Primary Examiner*—S. Leon Bashore
*Assistant Examiner*—Michael Goldman
*Attorney, Agent, or Firm*—Fitch, Even, Tabin, Flannery & Welsh

[57] ABSTRACT

A system for significantly reducing the dissolved oxygen content of a liquid. Liquid is pumped from a supply source to a deoxygenation chamber through a line containing a sparger for injecting a gas, such as nitrogen, as bubbles having an average size of not greater than about 5 mm. The sparger is spaced a predetermined distance upstream of the chamber to achieve contact at the bubble interface for a desired length of time. The pressure of the liquid is lowered when it reaches the chamber, releasing the nitrogen bubbles which are vented to the atmosphere along with the oxygen stripped from the liquid. The dissolved oxygen content of said liquid can be monitored at a location upstream of the sparger, and adjustments made to the amount of nitrogen being injected based upon the D. O. level monitored.

1 Claim, 2 Drawing Figures

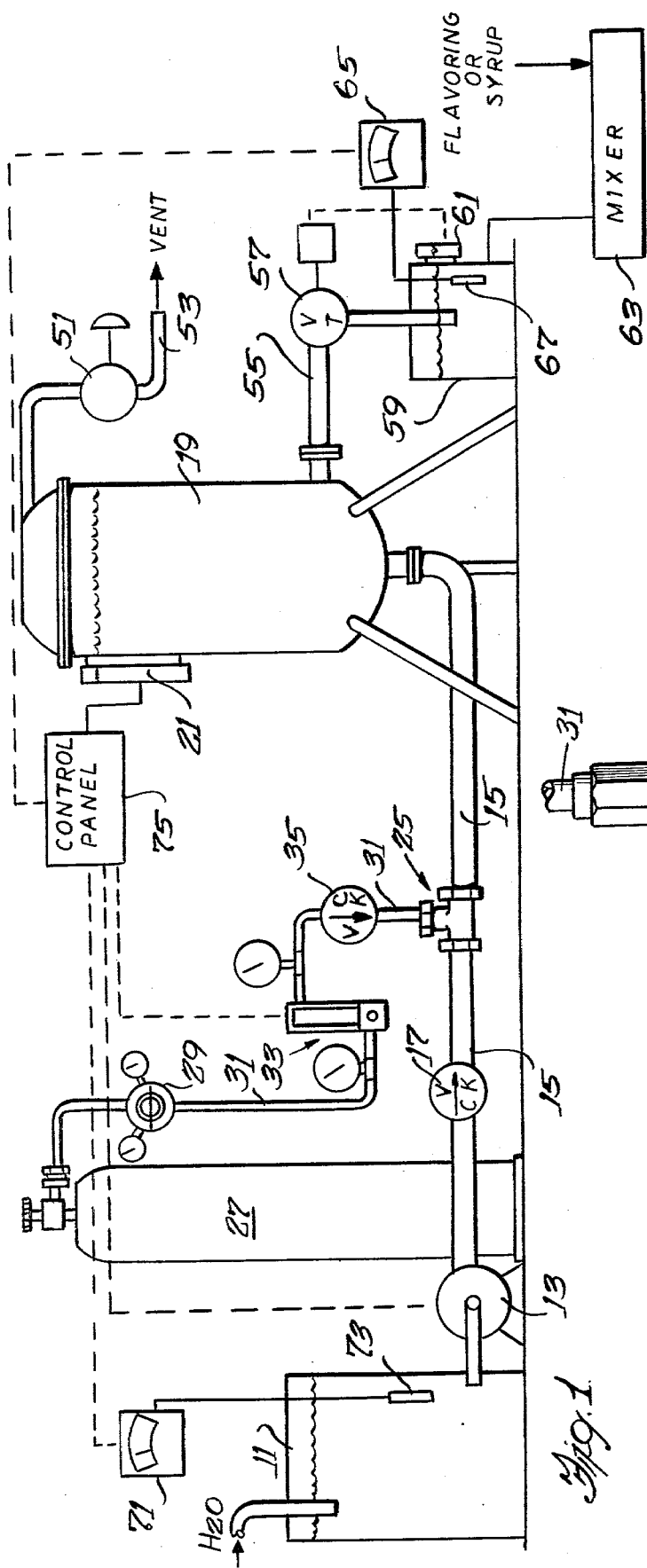
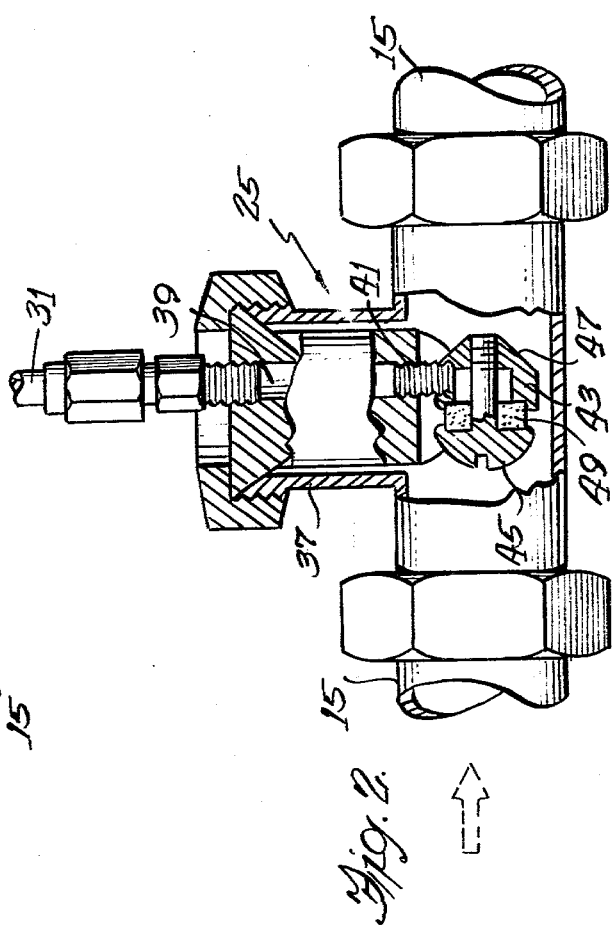

DEOXYGENATION OF LIQUIDS

The present invention relates generally to the deoxygenation of liquids and more particularly to the employment of gas sparging to remove dissolved oxygen from food products and other oxygen-sensitive liquid materials.

BACKGROUND OF THE INVENTION

The primary reason for the deterioration of many food products is the presence of oxygen, and the removal of oxygen from within a container increases the shelf life and thus makes products saleable over a greater period of time while also reducing losses through spoilage. Vacuum deaerators have been commercially available for some time and have been used to lower the oxygen level in liquid products and the like by the simple expedient of subjecting such products to a mechanically induced vacuum. Likewise, at the time of packaging, foodstuffs have been subjected to gas-flushing. For example, nitrogen has long been used as an inerting medium in the production of wine and champagne, and it has also been used to flush or purge empty bottles and to inert the head space in edible oil packaging to improve shelf life and appearance.

Vacuum deaerators are fairly expensive to purchase and are not entirely satisfactory because they do not normally reduce the dissolved oxygen content to a totally acceptable level. Likewise, although head space purging slows deterioration by significantly reducing the amount of oxygen available within the void region of the package with which a reaction can take place, it is limited in the effect which it has upon dissolved oxygen. The use of nitrogen as a sparging material for stripping oxygen from liquids is an effective method of removing dissolved oxygen.

SUMMARY OF THE INVENTION

A very effective method of reducing the dissolved oxygen content of a liquid to a level below that normally obtained by vacuum deaeration devices has been found. Small nitrogen bubbles are injected into a stream of liquid as it flows through a confined region, and the stream is maintained in laminar flow for a substantial distance downstream of the point of injection. Thereafter, the stream is discharged into a larger region, termed a deoxygenation zone, where the pressure is maintained at a lower level by the venting of a gas therefrom. Venting removes from the liquid not only the nitrogen that was sparged thereinto, but also the oxygen which the nitrogen strips therefrom. By monitoring the dissolved oxygen content of the liquid at a point upstream of the sparging location, the rate at which nitrogen is injected into the liquid can be adjusted so as to achieve the relatively constant, low level oxygen content that is desired in the liquid which is withdrawn from the deoxygenation zone.

BRIEF DESCRIPTION OF THE DRAWINGS

FIG. 1 is a schematic view of a system for deoxygenating liquids which embodies various features of the invention; and FIG. 2 is an enlarged view of the sparging device illustrated in FIG. 1, which is shown partially in section and with portions broken away.

DETAILED DESCRIPTION OF THE PREFERRED EMBODIMENT

Since the early 1970's, the volume of noncarbonated beverages has steadily increased each year and represents a significant market or application where the preservation of flavor and appearance is quite important. Such beverages are made by blending syrups with water, and although the blended product can be deoxygenated, preferably the water is treated prior to mixing to reduce the dissolved oxygen content to desired levels.

In the embodiment illustrated in FIG. 1, water from a suitable source is supplied to a tank 11 where its temperature is held between about 0° C. and about 20° C. The water is withdrawn from the tank 11 and increased in pressure by a pump, such as a centrifugal pump 13. The discharge line 15 from the pump 13 includes a check valve 17 and leads to the deoxygenation chamber 19 which it enters at a point below the liquid surface level.

The level of water in the deoxygenation chamber is controlled by a liquid level control 21 which might include a float or the like (not shown). Whenever the level of water within the chamber 19 falls to the lower limit, the pump 13 is actuated so as to supply sufficient water to raise the level to the upper limit set by the control 21. Disposed in the line 15, downstream of the check valve 17, is a sparger 25 through which an appropriate gas, such as nitrogen or carbon dioxide, is injected into the stream of water being pumped therepast. Nitrogen is preferred and can be supplied from any suitable source, such as a cylinder 27 of high pressure nitrogen having a suitable pressure reduction valve 29 or from an insulated container which holds liquid nitrogen and supplies vapor at a desired pressure. Nitrogen from the cylinder assembly flows through a line 31 that connects to a flow control assembly 33 which can be set to allow the flow of nitrogen therepast at a desired fixed rate or which can be adjusted so as to vary the rate at which nitrogen will be fed to the sparger 25. A check valve 35 is included in the line 31.

The preferred type of sparger is one which is described in detail in U.S. Pat. No. 3,165,562, issued Jan. 12, 1965 to L. W. Young and J. M. Venetucci, the disclosure of which is incorporated by reference into this application. The sparger 25 is depicted in greater detail in FIG. 2 which shows an enlarged version thereof. Basically, the sparger is provided as a part of a tee connection 37, with the discharge line 15 through which the water is pumped being connected to the coaxial legs of the tee. The remaining transverse leg of the tee holds the sparger assembly, which essentially occupies and blocks the third leg except for a passageway 39, the inlet end of which is connected to the source of gaseous nitrogen, i.e., the line 31. The outlet end of the passageway 39 is connected, via a short, threaded pipe nipple 41, to the cylindrical body 43 of the sparger, which is disposed coaxially within the main, straight passageway through the tee 37.

The upstream end 45 of the sparger body 43 is rounded to minimize turbulence in the flowing stream of water and is preferably a section of a sphere. The downstream end 47 of the sparger preferably has a frusto-conical shape to likewise minimize turbulence. The central portion of the sparger assembly includes a porous, annular, sintered metal dispenser or element 49 through which the gaseous nitrogen is bubbled into the stream of water flowing therepast. The porous annulus 49 is preferably made from particles of stainless steel which have been sintered to provide a uniform array of very small passageways having a mean pore size of between about 10 and 40 microns. The nitrogen under pressure permeates outward through the interstices of this sintered metal annulus 49 and bubbles into the passing liquid through the outer cylindrical surface. The relatively high instantaneous shear force which acts upon the gas accumulating at the surface rapidly removes the gas from the surface of the porous cylinder as minute gas bubbles and results in a very efficient dispersion of gas throughout the flowing stream of liquid. Preferably, the pressure of nitrogen is adjusted so that the average diameter of the bubbles is below about 5 mm. and preferably between about 2.8 mm. (about 0.11 inch) and about 3.8 mm. (about 0.15 inch). Generally, smaller bubbles are preferred because they provide a larger total interfacial area.

As a result, the minute bubbles of nitrogen gas are dispersed throughout the flowing stream of water in a relatively confined region, i.e., the cross sectional area of the line, and this distribution is maintained for a sufficient time, i.e., between about 0.1 second and about 3 seconds, so that effective interchange between dissolved $O_2$ in the liquid and $N_2$ in the bubbles can take place at the interfacial boundary before the flowing stream reaches the deoxygenation chamber 19. This desired length of time is obtained by spacing the sparger 25 an appropriate minimum distance from the submerged entry to the deoxygenation chamber, which distance depends of course on the velocity of the water flow through the line 15, which is normally of a constant diameter. It has also been found to be important that the size of the cross section of the line 15, relative to the flow rate of the water, be such that the flow is laminar, as opposed to turbulent, in order to assure that effective gas interchange occurs. As an example of one system, for a line 15 having an internal diameter between about 1 inch and 3 inches and the velocity of flow should be between about 7 feet per second (2.13m/sec.) and about 20 ft/sec. (6.1 m/sec). Moreover, it has surprisingly been found that, as the velocity of the liquid in the line 15 is increased, the percentage of dissolved $O_2$ removed increases even though the amount of gas supplied relative to the volume of liquid treated is held constant. Preferably, a flow rate of at least about 10 ft/sec (3.0 m/sec) is used.

The distribution of the small bubbles of nitrogen throughout the liquid stream creates a large surface area of interface between bubbles and liquid, and the liquid at this interface is exposed to a very high partial pressure of nitrogen. As a result, the dissolved oxygen in the liquid has a tendency to immediately transfer from the liquid into the bubble in order to increase the partial pressure of oxygen in the small bubble of nitrogen to which the liquid is exposed.

The pressure within the deoxygenation chamber 19 is controlled by a back-pressure regulator 51, which is disposed in a vent line 53 that exits from the top of the chamber. The back-pressure regulator 51 may be set to maintain a pressure of about 2 atms. in the chamber 19, but it is preferably set to allow the pressure to build-up to about 3 atmospheres and then suddenly release and decrease to about 2 atmospheres. This arrangement and the accompanying drop in fluid velocity that occurs when the flowing liquid stream enters the larger region of the chamber 19 has been found to be very effective in removing the bubbles, which naturally rise to the upper surface, from the liquid and thereafter venting the sparged nitrogen, plus the oxygen which it has stripped from the liquid, out of the chamber through the vent line 53. If carbon dioxide is used instead of nitrogen, it may be necessary to employ a slightly larger relative quantity because of its tendency to dissolve; however, this could be an advantage should the deoxygenated liquid be intended for preparing a carbonated beverage.

The deoxygenated water is withdrawn from the chamber 19 through a line 55 which contains a throttling valve 57 that reduces the pressure to atmospheric pressure as it is allowed to flow into a make-up tank 59. The make-up tank 59 may also contain a liquid-level control 61 that is set to open and close the throttling valve 57 to maintain the desired level of deoxygenated water therein. Water from the make-up tank 59 is then suitably fed to a mixer 63 where it is blended with flavoring and perhaps sugar and vitamins, such as ascorbic acid, to create a syrup, or instead with a premixed syrup to create the finished beverage composition, ready for bottling or canning. The make-up tank 59 is preferably maintained under a nitrogen atmosphere, as is the mixing and bottling operation.

The basic system described thus far can be rendered somewhat more sophisticated to assure that the desired standards are met. The water supply tank 11 can be equipped with a dissolved oxygen meter 71 (a standard item of commerce) which has a probe 73 that is submerged within the liquid in the tank. The dissolved oxygen meter 71 reads the level of oxygen in the incoming water and sends an appropriate signal to a control panel 75. The control panel 75 is pneumatically or electrically connected to the sparger flow control assembly 33 and thus can adjust the flow rate of gaseous nitrogen to the sparger 25 based upon the signal which the control panel 75 receives from the D.O. meter 71 in the incoming water tank 11. Experience with the system enables setting the flow rate of nitrogen such as to achieve a desired end point, preferably below about 2 parts per million (ppm) of dissolved oxygen, for the water leaving the deoxygenation chamber 19, based of course upon a reasonable level of dissolved oxygen in the incoming liquid.

In desired, however, a second D. O. meter 65 can be provided with a probe 67 that is associated with the make-up water tank 59 and thus provides a direct readout of the amount of oxygen in the deoxygenated water. By also feeding the signal from this second D. O. meter 65 to the control panel 75, a further safeguard is provided, and immediate adjustments can be made to slightly increase or decrease the flow rate of nitrogen should the level of oxygen begin to slightly vary from the desired level.

The effectiveness which the overall system achieves is premised upon the ability to fill the stream of incoming liquid with minute nitrogen bubbles and to maintain this condition for a period sufficient that the dissolved oxygen exits from the liquid at the interface between liquid and bubble during the period of laminar flow through the confined region of the liquid line 15. As a result, when the stream reaches the deoxygenation chamber where its fluid velocity drops because it is no longer confined in this larger, lower pressure region, the minute bubbles tend to coalesce or agglomerate to larger ones which promptly rise to the surface, whence they are vented to the atmosphere carrying the stripped oxygen with the sparged nitrogen. The overall arrangement is considerably less in capital cost than previously employed vacuum deaeration systems and is substantially more efficient because it is capable of simply and expeditiously reducing the dissolved oxygen content to quite low levels, i.e., less than two ppm. Because the deoxygenated water chamber 19 is preferably operated at about 2 atm., an additional pump is not needed to supply water to the make-up tank 59.

Although the invention has been described with regard to a preferred embodiment, it should be understood that changes and modifications as would be obvious to one having the ordinary skill in the art may be made without departing from the scope of the invention which is defined in the appended claims. For example, as earlier indicated, the system is equally effective in treating liquids other than water, and it can be employed to deoxygenate the liquid component that will be used in preparing an oxygen-sensitive product. Likewise, if desired, mixing with flavoring or syrup can be carried out prior to the sparging, and the ultimate beverage composition (i.e., when a beverage is being prepared) can then be subjected to the sparging-deoxygenation process. Particular features of the invention are emphasized in the claims which follow.

What is claimed is:

1. A method of significantly reducing the dissolved oxygen content of water and preparing a flavored beverage therefrom, which method comprises causing said water to flow as a stream through a confined region at velocity of between about 10 ft./sec. and 20 ft./sec. and at a pressure of at least about 2 atmospheres, monitoring the dissolved oxygen content of said incoming water stream, injecting nitrogen into said stream as bubbles having an average size of not greater than about 5 mm., adjusting the amount of nitrogen being injected as a result of changes in the D.O. level being monitored to strip enough oxygen from the water to reduce its dissolved oxygen content to below about 2 ppm., maintaining said stream in laminar flow downstream of the location where injection occurs for between about 0.1 second and about 3 seconds, then discharging said stream into a larger water-containing region at a location below the liquid surface therewithin and lowering the fluid velocity and pressure in said larger region to remove nitrogen and the oxygen which the nitrogen strips from said water, allowing said pressure in said larger region to gradually build up to a pressure of at least 3 atm. and periodically dropping it to about 2 atm., withdrawing the deoxygenated water from said larger region through throttling valve means and delivering it to a mixing zone, and mixing flavoring with said deoxygenated liquid in said mixing zone to prepare a flavored beverage.

* * * * *